United States Patent [19]
Dunn et al.

[11] Patent Number: 5,790,650
[45] Date of Patent: Aug. 4, 1998

[54] TELEPHONE CALL CENTER MANAGEMENT SYSTEM WHICH SUPPORTS MULTI-USER AND SEPARATE PRIVATE APPLICATIONS

[75] Inventors: Judith A. Dunn, Westford, Mass.; B. Scott Smith, Londonderry, N.H.; Michael S. Carney, Lowell, Mass.

[73] Assignee: Davox Corporation, Westford, Mass.

[21] Appl. No.: 634,473

[22] Filed: Apr. 18, 1996

Related U.S. Application Data

[63] Continuation-in-part of Ser. No. 619,164, Mar. 21, 1996, Pat. No. 5,592,543, which is a continuation of Ser. No. 252,121, Jun. 1, 1994, abandoned.

[51] Int. Cl.[6] .................................................. H04M 3/00
[52] U.S. Cl. ........................ 379/265; 379/268; 379/269
[58] Field of Search ................................. 379/265, 266, 379/309, 214, 201, 269, 268

[56] References Cited

U.S. PATENT DOCUMENTS

| | | | |
|---|---|---|---|
| 5,469,504 | 11/1995 | Blaha | 379/265 |
| 5,500,891 | 3/1996 | Harrington et al. | 379/265 |
| 5,535,256 | 7/1996 | Maloney et al. | 379/265 |

*Primary Examiner*—Ahmad F. Matar
*Attorney, Agent, or Firm*—Daniel J. Bourque, Esq.; Kevin J. Carroll, Esq.

[57] ABSTRACT

A telephone call center management system capable of simultaneously operating at least two separate telephony applications. A first group of agents is assigned to service a first telephone application. A first telephony center supervisor is assigned to at least view the operation of at least the first telephone application and at least the first group of agents. A second group of agents is assigned to service a second telephone application, while a second telephony center supervisor is assigned to at least view the operation of the second telephone application and the second group of agents. A supervisor can not view or control the agents or resources of an application not assigned to that supervisor. Supervisors may be assigned different application access levels, which control how much supervision supervisors have over the agents in applications the supervisors may access.

20 Claims, 5 Drawing Sheets

150

| <AGENT ID 1> | <APPLICATION ID 1> | <HISTORICAL DATA ...> |
|---|---|---|
| <AGENT ID 1> | <APPLICATION ID 2> | <HISTORICAL DATA ...> |
| <AGENT ID 2> | <APPLICATION ID 1> | <HISTORICAL DATA ...> |
| ⋮ | ⋮ | ⋮ |

TELEPHONE CALL CENTER MANAGEMENT SYSTEM WHICH SUPPORTS MULTI-USER AND SEPARATE PRIVATE APPLICATIONS

CONTINUATION DATA

This application is a continuation-in-part of U.S. patent application Ser. No. 08/619,164, filed Mar. 21, 1996, now U.S. Pat. No. 5,592,543, which is a continuation of U.S. patent application Ser. No. 08/252,121 filed on Jun. 1, 1994, now abandoned.

FIELD OF THE INVENTION

This invention relates to a telephone call center management system and more particularly, to a telephone call center management system that supports multiple users and telephony applications, each such multiple telephony application being accessible only by the appropriate user.

BACKGROUND OF THE INVENTION

Many businesses such as customer service organizations and telemarketing organizations utilize telephony call centers to process and route incoming and outgoing telephone calls. One example of such a telephone call center and call center management system is the UNISON® system provided by Davox Corporation of Westford, Mass. This system performs and automates many of the tasks associated with processing incoming calls and placing outgoing calls to reach customers or clients and connect them with agents.

Telephony call centers typically include, for example, automated dialers, inbound call handling equipment, Automated Call Distributors (ACD), voice response units (VRU), and telephone line switches, as well known in the art. Such call centers allow for outbound dialing customer call account records to be grouped together into call lists and processed as a call campaign. A call campaign consists of one or more call lists of customers to be contacted for outbound call handling. The call campaign may also include a method of handling incoming calls. The telephony call center technology allows simultaneous running of several call campaigns, be they inbound or outbound.

Agents answering connected telephone calls, whether inbound or outbound, may be shared among campaigns, so that agent efficiency and productivity is increased. Agents may also be added or removed from telephone call campaigns as the call campaign requirements dictate. For example, as a call campaign nears completion, agents may start to be moved to other active call campaigns. The telephone call center management system; keeps track of its resources such as telephone lines, agents, call campaigns and supervisors, and allocates the resources as appropriate, for maximum efficiency and productivity.

Present day advanced telephone call centers are technologically capable of handling more simultaneous call campaigns than required by a single company or call service agency. Additionally, one company or call service agency may wish to divide or partition its internal organization into physically or functionally separate "groups" for various reasons including internal competition and campaign type. Such companies and call service agencies would be interested in sharing the telephone call center among several such companies or user groups. Since the telephony system can simultaneously run many different applications, campaigns, and incoming call distributions while managing all system resources, sharing such a system would seem fairly simple.

Existing telephone call center management systems do not, however, provide for call campaign or telephony application privacy. Individual telephony applications often require the use of company confidential telephony lists and customer account information which must be maintained secure and confidential. If two companies choose to share one telephone call management system, all application and campaign data on the system would be fully accessible by both companies. This prevents or discourages sharing such telephony equipment which could provide users outstanding features at greatly reduced costs and meet the requirements of several such companies or groups, without the need for each company to purchase their own system.

Accordingly, what is needed is a telephone call center management system which can treat a telephony call center as several separate physical units, in that several parties may use the equipment to process incoming and outgoing calls, but are unable to view or access any information outside of their own pre-established telephony applications.

SUMMARY OF THE INVENTION

The present invention features a telephone call center management system comprising a telephony resource server, capable of simultaneously operating at least two separate telephony applications. A first group of agents, coupled to the telephone resource server, service the first telephony application. A first supervisor views and controls the operation of at least the first telephone application and at least the first group of agents. A second group of agents service the second telephone application, while a second telephony center supervisor viewing and controlling the operation of the second telephone application and the second group of agents.

A telephone resource server controller allows the assignment of at least one of the at least two telephone applications to one of the supervisors and one of the groups of agents.

Supervisors have several different application access levels, including administrative, supervisory, and view-only. The application access level defines how much control a supervisor has over assigned applications.

The telephony resource server controller includes agent data structures which include information on which application groups each agent is assigned to. Similar data structures are used for supervisors, but also include indications of the application access level as well as the application groups.

Historical information on each agent's performance, such as talk time, wrap-up time, call results and application performance statistics such as call pacing, are collected and stored in a historical information data structure by the telephony resource server controller. Historical information may be selected based on agents, application groups, or both.

BRIEF DESCRIPTION OF THE DRAWINGS

These and other features and advantages of the present invention will be better understood by reading the following detailed description, taken together with the drawings wherein:

FIG. 6 is a block diagram of an agent/application historical data structure for use in producing statistical data.

DETAILED DESCRIPTION OF THE PREFERRED EMBODIMENT

Figure 1:
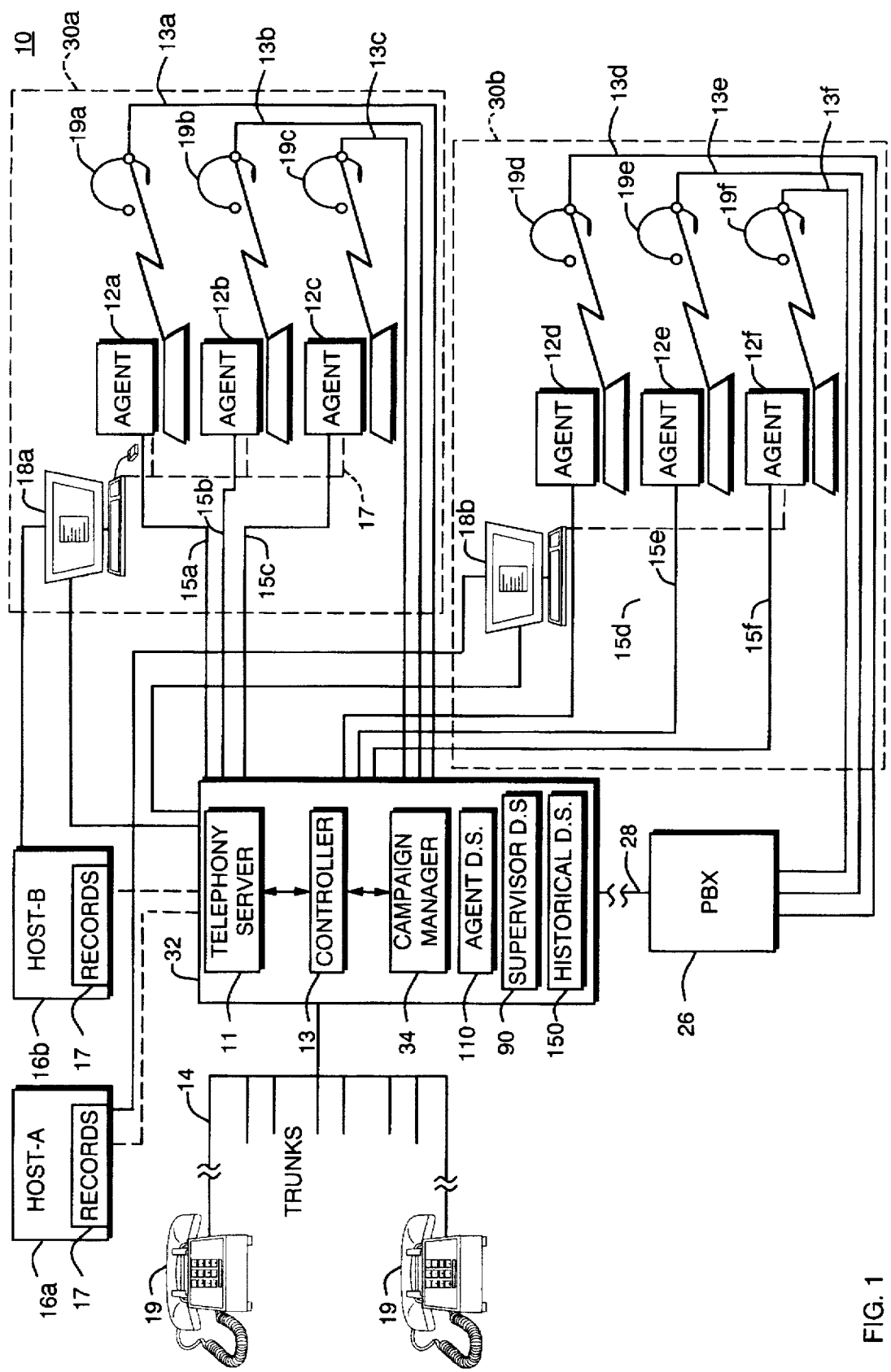
FIG. 1 is a schematic block diagram showing a telephony call center and telephone call center management system according to the present invention which allows two completely separate groups or companies to use the same common call center equipment telephony controller and resource server, dialing system, and trunk lines.

An exemplary telephone call center 10, FIG. 1, with a call center management system 32 capable of supporting telephony application grouping, according to the present invention, is typically coupled to one or more host computers 16a, 16b or other similar source of customer account records 17. The customer account records 17 are generally processed and grouped into call lists of customer account records to be dialed (called), known as call campaigns, by either the host computer 16, supervisor work station 18, or telephone call center management system 32. The call lists are downloaded to the campaign manager 34. The telephony call center manager 32 includes controller 13, a telephony server 11 and application or campaign manager 34, which cooperate to provide outbound call dialing and incoming call routing as well as information to be displayed on agent terminals 12a–12c and call center statistics displayed on supervisor workstation 18. The campaign manager 34 controls the telephony resource server, shown generally as 11, which may include one or more elements such as an automatic call dialer to dial outbound calls, and an automated call distributor (ACD) to distribute incoming calls, one or more voice response units (VRU's) and other telephony related devices as well known in the art.

Telephony call center management system or manager 32 is connected to a plurality of telephone trunk lines 14 which allow calls to be dialed out to or received from customer telephones 19. Telephony resource server 11 routes the voice portion of any connected calls over telephone lines 15 to agent telephones or headsets 19. Controller 13 retrieves customer account data from customer records 17 stored on host 16, and allows data for an individual customer account (record) connected to an agent to be displayed on agent workstations 12. For additional details of such a feature, see U.S. Pat. No. 5,164,981 entitled Voice Response System With Automated Data Transfer issued to Davox Corporation. A supervisor workstation 18 allows a supervisor to monitor and control the call campaigns.

The present invention allows a single telephone call center management system 32 and trunks 14 to simultaneously handle more than one telephony application. A telephony application comprises a plurality of agents assigned to handle telephone calls from a predetermined application group (a predefined type of telephone calls to handle), one or more agent supervisors for the application group, and other system resources including pre-established call campaigns which control how inbound and outbound telephone calls are to be handled or processed by the call center.

The pre-established call campaigns control certain features of each campaign including, for purposes of this invention, which call campaigns are to be treated as private or organized as an "application group" by the telephone call center management system according to the present invention.

According to the present invention, a supervisor belonging to one application may not view or access resources, data, or results of another application, unless the supervisor has the proper access level.

Accordingly, a first telephony application group 30a, includes at least a first supervisory workstation 18a, a plurality of agent workstations 12a–12c coupled to telephone call center management system 32 by data signal paths 15a–15c, and agent telephones or headphones 19a–19c coupled by voice signal paths 13a–13c.

A second telephony application group 30b is completely separate from the first telephony group application 30a. The second application group 30b may include its own separate supervisor workstation 18b, agent workstations 12d–12f serviced by data signal paths 15d–15f, and agent telephones or headphones 19d–19f, coupled by voice signal paths 13d–13f. Alternatively, one supervisor can oversee both application groups 30a and 30b if allowed by the system administrator. In one embodiment, application group 30a is located at a different physical location from application group 30b in that the supervisor, agents and agent terminals of application 30b may be located in a separate room of the same building or in a completely separate building from the telephone call center management system 32 and/or application group 30a. Telephony server resource 11 may provide telephone signal routing through a T-24 high speed communication path 28 to a private branch exchange or other similar internal call distribution unit 26. In the preferred embodiment, the high speed T-24 connection 28 may transmit and receive up to 24 telephony signals and controls over one high speed communication line.

The supervisor using supervisory workstation 18a in application group 30a will be unable to view or access any of the agents or resources being used by application group 30b, and vice-versa unless access has been allowed. In effect, the supervisor and agents in application group 30a will get the impression that they are the only users of the entire telephone call center. Each separate application group will have this same impression.

Although in the previous example, the application group 30a and 30b are physically separated, the telephony call center 10 using and implementing the present invention need not be physically separated. Indeed, one company may wish to promote internal competition and operate its single call center as two or more application groups 30a–30b. In addition, a separate supervisory workstation 18b and/or a separate supervisor may not be necessary. Each supervisor may use the same workstation, with each supervisor logging on to his or her own assigned application group. A supervisor logging on to his or her own assigned application group will see only resources, agents and call results associated with the one or more application group(s) to which that supervisor has access rights. Supervisor access rights are designated by a system administrator and stored in the call center manager 32 as a supervisor data structure 90, FIG. 3, described further below.

In the preferred embodiment, supervisor workstations 18a, 18b are networked, stand-alone workstations such as a Sun Microsystems SPARC workstations.

The agents at their agent workstations 12 need not be physically separated, but may be intermixed with agents assigned to other application groups. Telephone resource controller 13 will manage the agents and resources and allow the application grouping to be performed as will be described below. There is also no limit of the number of application groups or companies that can run separated applications, except for the processing power of the telephone call center manager 32.

Agents are assigned to an application group 30 using agent attributes, which are described more fully in co-pending U.S. patent application Ser. No. 08/619,164, now U.S. Pat. No. 5,592,543 entitled METHOD AND SYSTEM FOR ALLOCATING AGENT RESOURCES TO A TELEPHONE CALL CAMPAIGN, assigned to the assignee of the present invention and fully incorporated herein by reference. Agent attributes are designated by a supervisor or system administrator and stored as agent data structures 110, FIG. 2, in the call center manager 32.

Figure 2:
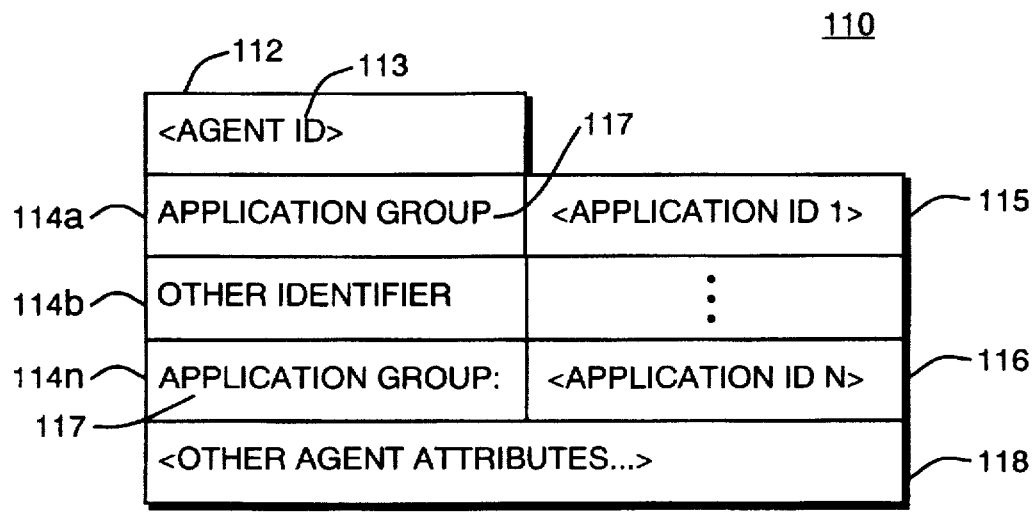
FIG. 2 is a schematic diagram of an agent data structure which allows each agent to be assigned an agent attribute for application groups, and to be assigned, if desired, to one or more applications.

An exemplary agent data structure 110, FIG. 2, contains an agent identification field 112 which contains a unique identifier 113 for each agent. The agent identifier is referenced at the time of the agent's log on. Field 114 contains agent attribute identifiers 117, at least one of which is an agent attribute identifier for application groups. The agent data structure 110 may also contain other fields 118 containing other data pertaining to the individual agent.

If the agent data structure 110 contains one or more agent attribute identifiers for application groups 114a, 114n, then the agent is assigned to one or more application groups by inserting unique application group identifiers in subsequent fields, such as application identifiers 115, 116. These applications can be dynamically added and removed from the agent data structure. The dynamic adding and removal of applications is performed by an agent maintenance interface of the call center management system 32 (not shown) which is controllable from supervisory workstation 18. An agent identified by this agent data structure will be assigned to the application group listed in the agent data structure 110.

Figure 3:
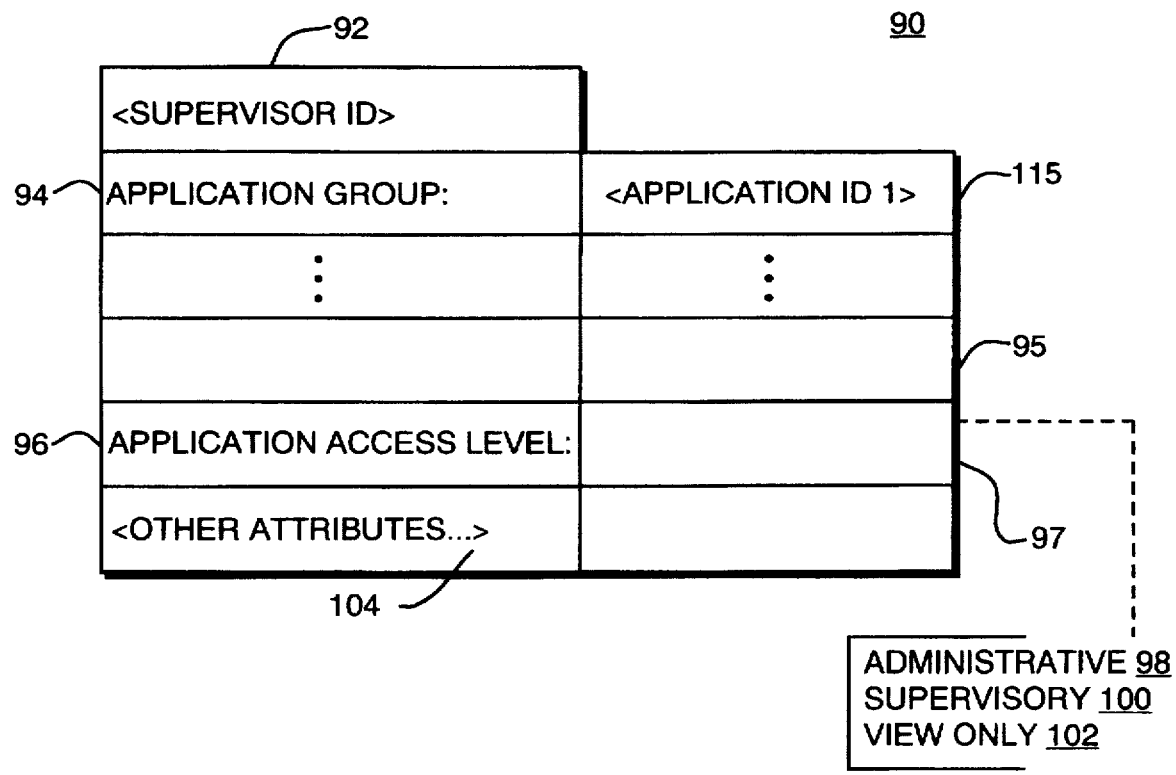
FIG. 3 is a schematic diagram of a supervisor data structure for allowing a supervisor to be assigned application access levels to applications.

The present invention further includes a supervisor data structure 90, FIG. 3, which includes a supervisor identification field 92 which contains a unique identifier value for that supervisor. Each supervisor will have a separate supervisor data structure with a separate identification field 92. In the preferred embodiment, supervisor data structure 90 contains supervisor attribute identifiers and values, similar to agent attributes. An attribute identifier for application groups is stored along with corresponding values which identify an application group, such as a first application group identifier value 115. Note in this example that since this application group identifier value 115 is the same value as stored in the agent data structure 110, the supervisor associated with supervisory data structure 90 and agent associated with agent data structure 110 belong to the same application group.

If supervisor data structure 90 contains at least one attribute identifier for at least one application group 94, it will also contain an attribute identifier detailing an application access level 96 and an application access level value 97, which may hold, for example, one of three values. The first value is administrative, 98. A supervisor with administrative level access 98 (the system administrator) can assign access levels, passwords, application groups, and application access levels to other supervisors. This "super-supervisor" has, by default, access to all campaigns, agents and supervisors across all applications.

The next possible application access level value is a supervisory access level value, 100. This value allows normal supervisory access to, and control of, only those campaigns and agents within the application(s) group to which the supervisor has supervisory access as identified by the one or more application group identifier value 115. The supervisor sees only those agents assigned to his or her application(s) group or those agents that are unassigned to any application. Supervisory access also allows the supervisor to modify agent information, including application group assignments for those agents assigned to the supervisor's application(s) group or those agents assigned to no application(s) group.

The third application access level value is view only, 102. This level allows the supervisor to only view campaigns and agents within the assigned application(s) group.

Figure 4:
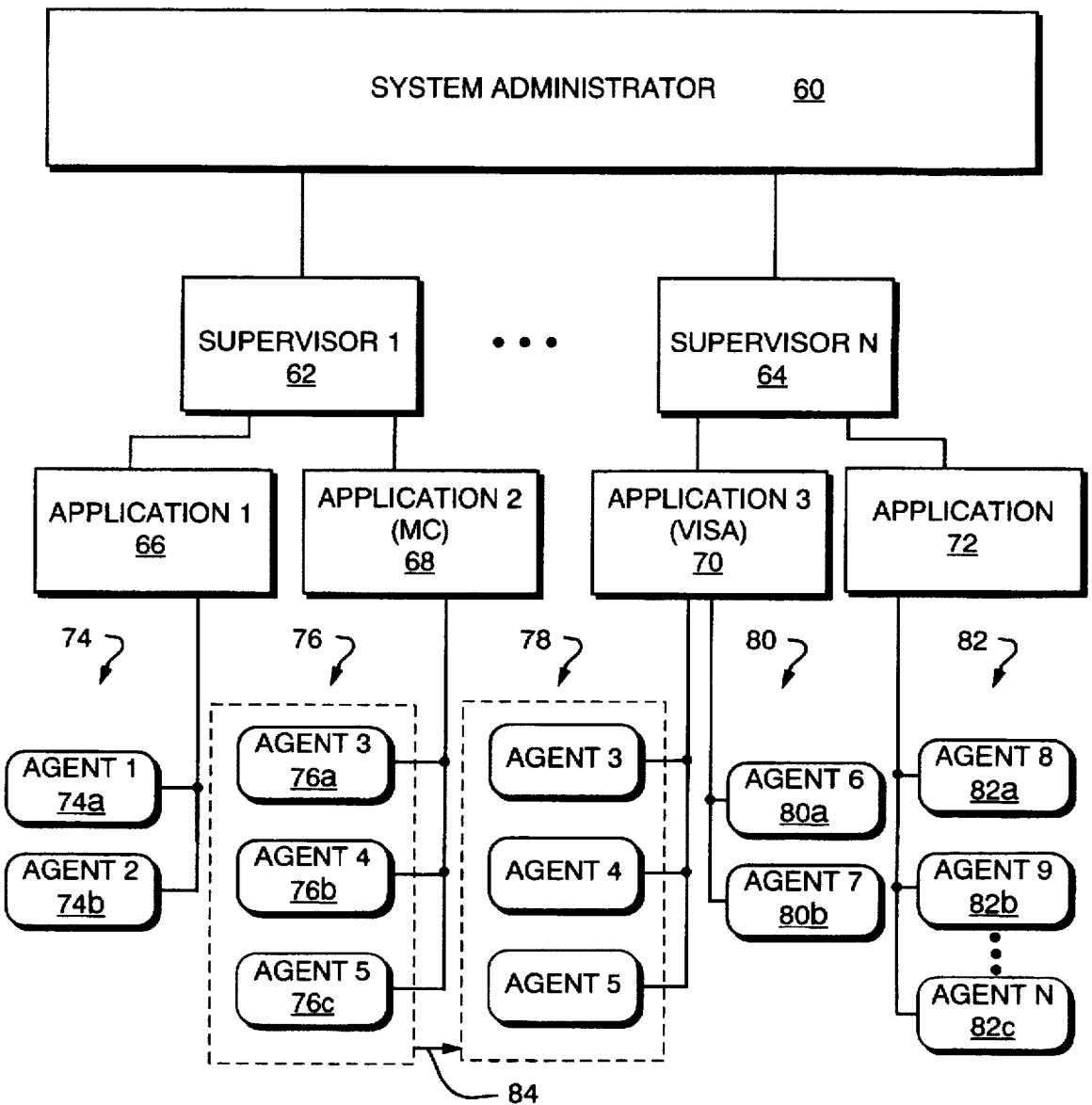
FIG. 4 is a schematic diagram showing how a telephony system using the present invention allows supervisors to partition and move agents by application.

Supervisors and agents are assigned to application groups (applications) by a system administrator 60, FIG. 4. A system administrator is a supervisor with administrative level access. For example, the system administrator 60 can assign applications and application access levels to supervisor 62 and supervisor 64. Supervisor 62 has access to two applications namely, application 66 and application 68. Application 66 has two agents 74a and 74b assigned to processing the application while application 68 has three agents 76a–76c assigned. Supervisor 64 has two applications, application 70 and application 72 assigned. Application 70 has two agents 80a–80b assigned while application 72 has 3 agents 82a–82c assigned.

Unless supervisor 62 is given the attribute of application group 70 and/or application group 72, in the supervisor's data structure 110, FIG. 4 he or she will not be able to view, supervise or administer those application groups based solely on his or her log on identification. Any agents assigned to application groups for which the supervisor has no corresponding application group attribute will be completely hidden from supervisor 62 and any information or data on telephony resources and call campaigns in those applications will also be unavailable.

Agents and application groups may be reassigned dynamically to provide for the needs of the telephone call center management system. In the preferred embodiment, a supervisor could reassign the agents using a supervisory workstation 18, FIG. 1 by modifying the agent's data structures 110, FIG. 2. The supervisory workstation 18 may contain a graphic user interface (GUI) such as SUN OPEN/ LOOK, to assist the supervisor.

As an example, if supervisor 62 is managing application group 68 which is a campaign to call overdue Mastercard customer accounts with agents 76a–76c (agent group 76) processing the application, those agents may be moved to another application when application 68 finishes or is winding down. If agents in agent group 76 are highly skilled at working with delinquent accounts to get payment, it would be helpful to transfer them to another application to increase the success rate of that application or call campaign. Those agents may be dynamically transferred (illustrated by arrow 84) to application group 70, which, for illustrative purposes, is shown as a call campaign for overdue Visa accounts.

To perform this change, a system administrator or a supervisor with an administrative access value in its supervisor data structure would use his or her supervisory workstation to transfer agents 76a–76c from application group 68 to application group 70 by adding the application group 70 identifier to the agent's data structure identifier value 115, and by removing the application group 68 identifier from the agents 76a–76c data structure. Agents 76a–76c would then be able to process customer call account records for application group 70. Alternatively, the supervisor could add the agents to application group 70, while simultaneously keeping them in application group 68, to allow the agents to service both applications.

In the preferred embodiment, the present invention is implemented in software running on one or more of controller 13, FIG. 1, supervisor workstation 18a or 18b, or possibly on host computer 16. A Graphic User Interface (GUI) on supervisory workstation 18 allows easy programming and modifying of application grouping.

In the preferred embodiment, application groups as described and claimed herein may interact with agent work groups which are described in a co-pending patent application Ser. No. 08/634,472 entitled "TELEPHONY CALL CENTER WITH AGENT WORK GROUPS" and identified as Attorney Docket No. DAVOX-137XX, fully incorporated herein by reference.

Figure 5:
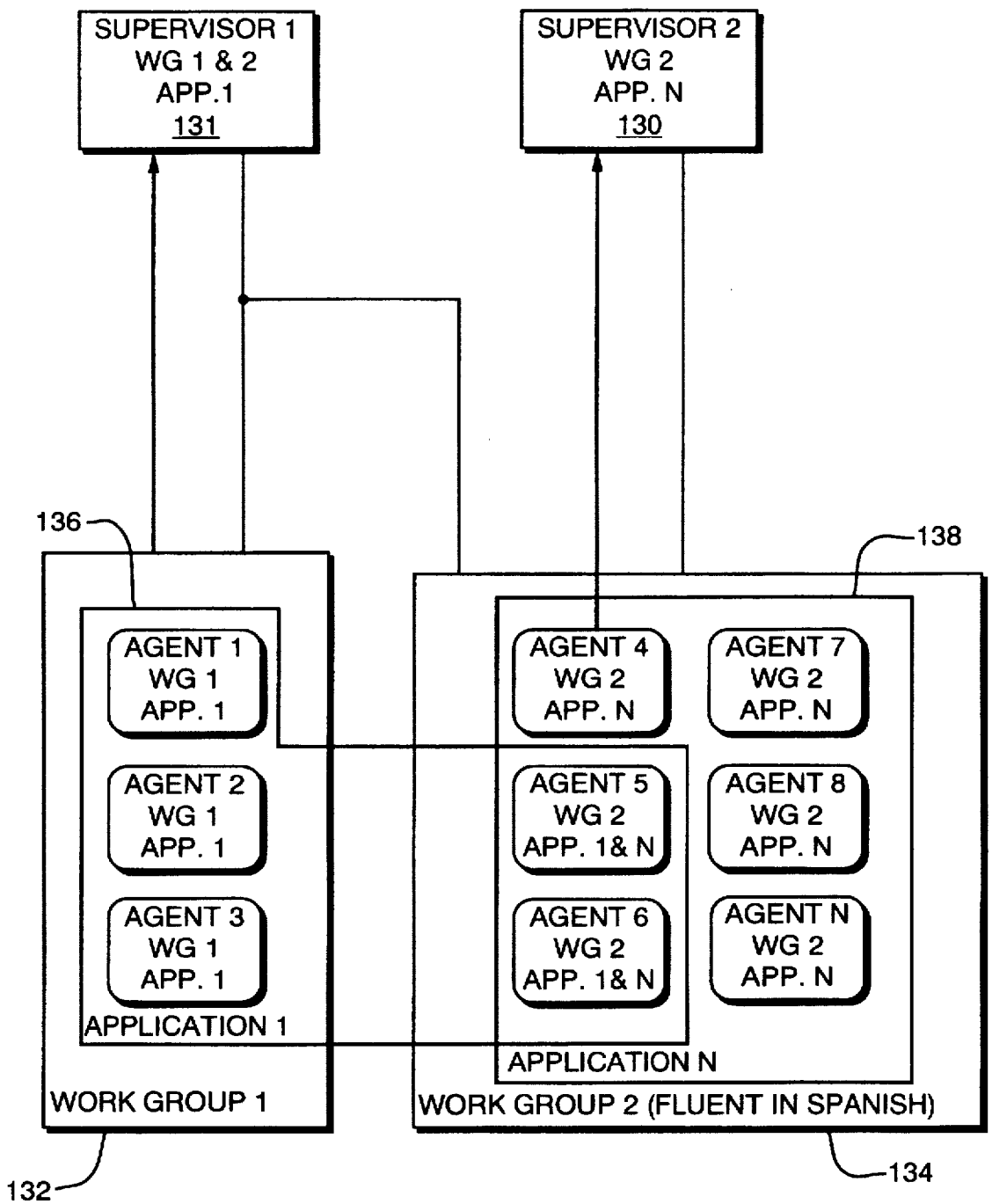
FIG. 5 is a schematic block diagram showing how application grouping, according to the present invention, interacts with agent work groups in affecting telephony information which a supervisor may view and control.

As an example, supervisor 130, FIG. 5, supervises work group 134 which includes agents 4–n who are fluent in Spanish. These agents are useful to contact clients and customers who speak Spanish. The agents in work group 134 are normally working on application 138.

Supervisor 131 has access to work group 132 and work group 134. Supervisor 131 is controlling application 136. For exemplary purposes, assume that application 136 is a call campaign to contact potential customers (cold calls) within a certain geographic district. As application 136 runs, supervisor 131 may realize that many of the contacted customers do not speak English. Since none of the agents in work group 132, agents 1, 2 or 3, are fluent in Spanish, supervisor 131 would like to "borrow" some agents from work group 134 to help handle these telephone calls. Since supervisor 131 does not have application access rights to application 138, supervisor 131 needs supervisor 130 to grant supervisor 131 access to application 138 so that supervisor 131 may transfer certain agents in application 138 to application 136. To perform this, supervisor 130 would need administrative 98 or supervisory 100 level access identifiers in supervisor 130's supervisor data structure 90, FIG. 3. If supervisor 130 has this access level, he or she may give supervisor 131 access to application 38 by adding an application group identifier 94 and an application value identification value 95 for application 138 to supervisor 131's supervisory data structure 90, using a supervisory workstation 18. Once supervisor 131 has access to application 138, he or she may add agents in application 138 to other applications. Supervisor 131 may then add agent 5 and agent 6 to application 136. Although agent 5 and agent 6 are still in work group 134, they are now also a part of application group 136. To make agent 5 and agent 6 exclusively part of application 136, supervisor 131 may remove the access to application 138 from the agent data structures of agent 5 and agent 6. Agent 5 and agent 6 will then work exclusively on application 136 until their application access is changed.

If agent 5 and agent 6 are part of application group 136, supervisor 130 may not view statistics on their work in application group 136, even though those agents are part of work group 134 which supervisor 130 may access. If agents 5 and 6 are shared between application 136 and application 138, then supervisor 130, when viewing statistics on application 138, will only see the activity of agent 5 and agent 6 with regard to application 138. The statistics for agent 5 and agent 6 with regard to application 136 will not be viewable by supervisor 130.

When a supervisor makes a request to the telephone call center manager 32 to provide agent information and statistics, the telephone call center manager scans through a data structure 150, FIG. 6 to limit the supervisor's access to only data of application groups that the supervisor may view. Data structure 150 stores data indexed by an agent identification 152, which matches the agent identification 112 in agent data structure 110, and application group identification 154 which is the same unique identification value 115 used in agent data structure 110, and in supervisor data structure 90. Data structure 150, for each call which each agent handles, maintains data or information 156 based on agent ID 152 and application group ID 154. This allows the telephone call center management system to provide individualized information on an application-by-application basis. The call center management system 32 may scan through application identification 154 of data structure 150 to provide information on all call activities within an application. If an agent is included in several applications, including one or more application groups that the requesting supervisor may not view, then the agent information on the non-viewable application group will not be included.

The present description demonstrates how the present invention allows agent resources and data to remain private even though other resource groupings such as work groups may be shared among supervisors. This allows great flexibility in configuring the call center and the telephone call management system to fit the needs of the users.

Accordingly, the present invention allows a call center to service more than one group, unit or company while maintaining application privacy and limited access to individual customer records and agent activities. Further, this limited access and privacy may be dynamically altered as required by the user.

Modifications and substitutions by one of ordinary skill in the art are considered to be within the scope of the present invention which is not to be limited except by the claims which follow.

What is claimed is:

1. A telephone call center management system, comprising:

a telephony resource server on which is simultaneously operable at least first and second telephony applications;

at least a first group of agent workstations, coupled to said telephony resource server, for use by a first group of agents assigned to said first telephony application for servicing said first telephony application;

at least a first telephony center supervisor workstation coupled to said telephony resource server, for use by a first supervisor assigned to said first telephony application, for at least viewing the operation of said first telephony application and accessing information relative to said first group of agents assigned to said first telephony application;

at least a second group of agent workstations, coupled to said telephony resource server, for use by a second group of agents assigned to said second telephony application for servicing said second telephony application;

at least a second telephony center supervisor workstation coupled to said telephony resource server, for use by a second supervisor assigned to said second telephony application, for at least viewing the operation of said second telephony application and accessing information relative to said second group of agents assigned to said second telephony application; and a telephony resource server controller, coupled to said agent workstations and said supervisor workstations, for allowing said respective first and second telephony center supervisors at said first and second telephony center supervisor workstations to at least view the operation of only respective assigned said first and second telephony applications, and to access only information relative to respective assigned said first and second groups of agents.

2. The telephone call center management system of claim 1, wherein said telephony resource server controller allows said at least a first telephony center supervisor to view only the operation of at least said first telephony application and at least said first group of agents.

3. The telephone call center management system of claim 1, wherein said telephony resource server controller allows said at least a first telephony center supervisor to control the operation of at least said first telephony application and at least said first group of agents.

4. The telephone call center management system of claim 1, wherein said telephony resource server controller allows said at least a second telephony center supervisor to view only the operation of at least said second telephony application and at least said second group of agents.

5. The telephone call center management system of claim 1, wherein said telephony resource server controller allows said second telephony center supervisor to control the operation of at least said second telephony application and at least said second group of agents.

6. The telephone call center management system of claim 1, wherein said group of agents includes at least one agent.

7. The telephone call center management system of claim 1, wherein said telephony resource server controller allows said first and second telephony center supervisors at said first and second telephony center supervisor workstations to respectively view and control the operation of only said respective assigned said first and second telephony applications and servicing results of said respective assigned said first and second groups of agents.

8. The telephony call center management system of claim 1, wherein said telephony resource controller includes an agent data structure, said agent data structure for providing an indication that each agent at an agent workstation in said first and second groups of agent workstations is assigned to respective said first and second telephony applications.

9. The telephony call center management system of claim 1, wherein said telephony resource server controller includes a supervisor data structure, said supervisor data structure for providing an indication that at least said first and second telephony center supervisors at said first and second telephony center supervisor workstations are assigned to respective said first and second telephony applications.

10. The telephony call center management system of claim 1, wherein said telephony resource server includes a historical information data structure, said historical information data structure for providing historical information on said first and second groups of agents and said first and second applications in said telephone call center management system.

11. The telephony call center management system of claim 9, wherein said supervisor data structure provides an indication of an application access level defining access by each of said at least a first and second telephony center supervisors respectively to said first and second applications and said first and second groups of agents.

12. The telephone call center management system of claim 1 further including at least one system administrator workstation, coupled to said telephony resource server, for use by a system administrator assigned to both of said first and second telephony applications, and wherein said telephony resource server controller allows said at least one system administrator at said at least one system administrator workstation to view the operation of said first and second telephony applications and to access information relative to said first and second groups of agents and said first and second supervisors.

13. A telephone call center management system, for managing agents in a telephone call center, said telephone call center management system comprising:

a telephony resource server, for initiating a plurality of telephony applications;

a plurality of agent workstations, coupled to said telephony resource server, for use by a plurality of agents, wherein each of said plurality of agents at said plurality of agent workstations are assigned to at least one of said plurality of telephony applications, forming a plurality of groups of agents assigned to a respective plurality of assigned telephony applications;

a plurality of supervisor workstations, coupled to said telephony resource server, for use by a plurality of supervisors, wherein each of said plurality of supervisors at said plurality of supervisor workstations are assigned to at least one of said plurality of groups of agents and at least one of said respective plurality of assigned telephony applications;

an agent data structure including a plurality of agent identifiers, for identifying each of said plurality of agents, and at least one application identifier associated with each of said plurality of agent identifiers, for identifying said assigned telephony applications to which each of said plurality of agents is assigned;

a supervisor data structure including a plurality of supervisor identifiers, for identifying each of said plurality of supervisors, and at least one application identifier associated with each of said plurality of supervisor identifiers, for identifying said assigned telephony applications to which each of said plurality of supervisors is assigned, said supervisor data structure further including an access level identifier associated with each of said plurality of supervisor identifiers, for identifying an access level of each of said plurality of supervisors with respect to said plurality of telephony applications and said plurality of groups of agents; and a telephony resource server controller, responsive to said supervisor data structure and said agent data structure, for allowing each of said plurality of supervisors to access, at said access level defined by said access level identifier, at least one of said plurality telephony applications and at least one of said plurality of groups of agents.

14. The telephone call center management system of claim 13 wherein said access level is selected from the group consisting of an administrative access level, a supervisory access level, and a view only access level, wherein said administrative access level allows access to and control over all of said plurality of telephony applications and all of said plurality of groups of agents and said plurality of supervisors assigned to said plurality of telephony applications, wherein said supervisor access level allows access to and control over only said assigned telephony applications identified by said at least one application identifier and respective ones of said plurality of groups of agents assigned to said assigned telephony applications identified by said at least one application identifier, and wherein said view only access level allows view only access to only said assigned applications identified by said at least one application identifier and respective ones of said plurality of groups of agents assigned to said assigned applications identified by said at least one application identifier.

15. A method of managing agents in a telephone call center including a telephony resource server, for controlling telephone calls in said telephone call center and handing of said telephone calls by said agents, a plurality of agent workstations, coupled to said telephony resource server, for use by a plurality of agents, and a plurality of supervisor workstations, coupled to said telephony resource server, for use by a plurality of supervisors, said method comprising:

initiating at least first and second telephony applications on said telephone call center;

assigning at least one of said plurality of agents at said plurality of agent workstations to each of said first and second telephony applications;

assigning at least one of said plurality of supervisors at said plurality of supervisor workstations to each of said first and second telephony applications;

assigning an access level to each of said plurality of supervisors assigned to said first and second telephony applications, wherein said access level defines an ability of each of said plurality of supervisors to access said first and second telephony applications and said at least one agent assigned to said first and second telephony applications; and allowing each of said plurality of supervisors at said plurality of supervisor workstations to access said first and second telephony applications and said at least one agent assigned to said first and second telephony applications based upon said access level assigned to each of said first and second supervisors.

16. The method of claim 15 wherein said access level is selected from a group consisting of an administrative access level, a supervisory access level, and a view only access level, wherein said administrative access level allows access to and control over at least said first and second telephony applications and said plurality of agents and said plurality of supervisors assigned to said first and second telephony applications, wherein said supervisor access level allows access to and control over only an assigned one of said first and second telephony applications and respective said at least one said plurality of agents assigned to said assigned one of said first and second telephony applications, and wherein said view only access level allows view only access to only an assigned one of said first and second telephony applications and respective said at least one of said plurality of agents assigned to said assigned one of said first and second telephony applications.

17. The method of claim 15 further including the step of:

providing an agent data structure including a plurality of agent identifiers, for identifying each of said plurality of agents, and at least one application identifier associated with each of said plurality of agent identifiers, for identifying an assigned one of said plurality of telephony applications to which each of said plurality of agents is assigned; and wherein the step of assigning at least one of said plurality of agents to each of said first and second telephony applications includes modifying said agent data structure by providing an application identifier corresponding to each of said first and second telephony applications to which said at least one of said plurality of agents is assigned.

18. The method of claim 15 further including the step of:

providing a supervisor data structure including a plurality of supervisor identifiers, for identifying each of said plurality of supervisors, and at least one application identifier associated with each of said plurality of supervisor identifiers, for identifying an assigned one of said plurality of telephony applications to which each of said plurality of supervisors is assigned, said supervisor data structure further including an access level identifier associated with each of said plurality of supervisor identifiers, for identifying said access level of each of said plurality of supervisors with respect to said plurality of telephony applications and said plurality of agents;

wherein the step of assigning at least one of said plurality of supervisors to each of said first and second telephony applications includes modifying said supervisor data structure by providing an application identifier corresponding to each of said first and second telephony applications to which said at least one of said plurality of supervisors is assigned; and wherein the step of assigning said access level to each of said plurality of supervisors includes modifying said supervisor data structure by providing an access level identifier corresponding to said access level assigned to each of said plurality of supervisors.

19. The method of claim 15 wherein assigning at least one of said plurality of agents includes assigning a group of agents to each of said first and second telephony applications.

20. The method of claim 15 wherein assigning at least one of said plurality of supervisors includes assigning first and second supervisors to respective said first and second telephony applications, and assigning a third supervisor to both said first and second telephony applications.

* * * * *